US011480729B2

(12) United States Patent
Grillanda et al.

(10) Patent No.: US 11,480,729 B2
(45) Date of Patent: Oct. 25, 2022

(54) THERMALLY COMPENSATED SLOT WAVEGUIDE

(71) Applicant: NOKIA SOLUTIONS AND NETWORKS OY, Espoo (FI)

(72) Inventors: Stefano Grillanda, Springfield, NJ (US); Ting-Chen Hu, Westfield, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 89 days.

(21) Appl. No.: 17/084,948

(22) Filed: Oct. 30, 2020

(65) Prior Publication Data

US 2022/0137295 A1   May 5, 2022

(51) Int. Cl.
 *G02B 6/12* (2006.01)
 *G02B 6/122* (2006.01)
 *G02B 6/293* (2006.01)

(52) U.S. Cl.
 CPC ......... *G02B 6/12028* (2013.01); *G02B 6/122* (2013.01); *G02B 6/29338* (2013.01); *G02B 6/29353* (2013.01); *G02B 6/29398* (2013.01); *G02B 2006/12061* (2013.01); *G02B 2006/12107* (2013.01); *G02B 2006/12142* (2013.01)

(58) Field of Classification Search
 CPC ...... G02B 6/12028; G02B 6/122; G02B 6/12; G02B 6/29; G02B 2006/12
 See application file for complete search history.

(56) References Cited

U.S. PATENT DOCUMENTS

| | | |
|---|---|---|
| 6,137,939 A | 10/2000 | Henry et al. |
| 6,757,469 B2 | 6/2004 | Bauer et al. |
| 6,987,895 B2 | 1/2006 | Johannessen |
| 7,062,127 B2 | 6/2006 | Purchase et al. |
| 7,424,192 B2 | 9/2008 | Hochberg et al. |
| 7,519,257 B2 | 4/2009 | Lipson et al. |
| 7,643,714 B2 | 1/2010 | Hochberg et al. |
| 7,689,072 B2 | 3/2010 | Bulthuis et al. |
| 7,693,384 B2 | 4/2010 | Lee et al. |
| 7,894,696 B2 | 2/2011 | Baehr-Jones et al. |
| 8,380,016 B1 | 2/2013 | Hochberg et al. |
| 8,818,141 B1 | 8/2014 | Hochberg et al. |

(Continued)

OTHER PUBLICATIONS

Athermal Waveguides for Temperature-Independent Lightwave Devices, Yasuo Kokubun, Norihide Funato, and Masanori Takizawa, IEEE Photonics Technology Letters, vol. 5, No. 11, Nov. 1993, p. 1297.

*Primary Examiner* — Tina M Wong
(74) *Attorney, Agent, or Firm* — Stratford Group Ltd.

(57) ABSTRACT

A photonic integrated circuit includes a slot optical waveguide having an optical core with sub-wavelength slot therein that is partially filled with a first lower-index material having a negative thermo-optic coefficient. The slot may also include a second lower-index material having a positive thermo-optic coefficient. The relative volume of the first lower-index material within the slot may be configured to provide athermal or nearly-athermal operation. Example applications include integrated AWG MUX/DEMUX devices, Mach-Zehnder modulators, and micro-ring resonators or modulators implemented with silicon-based or silicon-nitride based slot waveguides with reduced sensitivity to temperature changes.

20 Claims, 10 Drawing Sheets

(56) References Cited

U.S. PATENT DOCUMENTS

| | | |
|---|---|---|
| 8,846,969 B2 | 9/2014 | Gunter et al. |
| 9,057,839 B2 | 6/2015 | Rasras |
| 9,110,221 B2 | 8/2015 | Politecnico di Milano et al. |
| 9,360,627 B2 | 6/2016 | Bi et al. |
| 10,295,739 B2 | 5/2019 | Lipson et al. |
| 2006/0198579 A1 | 9/2006 | Bulthuis et al. |
| 2008/0069498 A1 | 3/2008 | Frolov |
| 2010/0322559 A1* | 12/2010 | Ogawa .................. G02B 6/124 703/2 |
| 2011/0170820 A1 | 7/2011 | Prather et al. |
| 2013/0071061 A1* | 3/2013 | Tu .......................... G01N 21/41 385/12 |
| 2015/0192803 A1* | 7/2015 | Lee ........................ G02F 1/011 385/2 |
| 2019/0206850 A1* | 7/2019 | Steglich .................. G02F 1/025 |
| 2020/0264370 A1* | 8/2020 | Namnabat ................ G02B 1/04 |
| 2022/0137295 A1* | 5/2022 | Grillanda ............... G02B 6/122 385/131 |

\* cited by examiner

US 11,480,729 B2

THERMALLY COMPENSATED SLOT WAVEGUIDE

TECHNICAL FIELD

The present disclosure relates to photonic integrated circuits and in particular to components thereof with enhanced temperature stability.

BACKGROUND

Optical communication systems, such as long-haul transmission systems, datacenters, and access networks, may use photonic integrated circuits (PICs) utilizing interferometric effects, for example for wavelength-dependent routing of optical signals and/or to modulate light. However, behavior and/or characteristics of such PICs may change in the presence of environmental temperature variations and thermal fluctuations, as the refractive index of materials used in a PIC is typically temperature-dependent. Temperature changes lead to changes in the refractive index of the materials that compose the PIC, and, as a consequence, to changes optical path lengths therein, thereby affecting its transfer function.

Typically, the temperature of integrated photonic devices and circuits is regulated through the use of heaters or thermo-electric coolers (TEC). These approaches enable tuning and/or stabilizing the circuit transfer function in the presence of temperature variations. However, active temperature stabilization techniques consume power and may require complex electronic circuitry to be integrated with the photonic chip.

SUMMARY

Embodiments described herein relate to photonic integrated circuits utilizing a slot optical waveguide comprising an optical core having one or more slots therein, and a lower-index material having a negative thermo-optic coefficient comprised in a portion of the one or more slots.

An aspect of the present disclosure provides a photonic integrated circuit (PIC) comprising: a substrate having a planar surface; and a slot optical waveguide located along the planar surface of the substrate. The slot optical waveguide has an optical core comprising two rails extending along the planar surface and being separated by a slot, and a first material having a negative thermo-optic coefficient (TOC) and a smaller refractive index than the rails. The first material fills a first region of the slot and may be absent from a second region of the slot along a same propagation segment of the slot optical waveguide. The PIC may comprise an optical cladding adjacent the optical core, with each of the two rails having a greater refractive index than the optical cladding. In some implementations at least one of the optical cladding and the two rails may have a positive TOC. In some implementations the optical cladding may comprise silica. In some implementations the rails may comprise silicon or silicon nitride.

In some implementations the optical cladding comprises a layer of silica, the two rails comprise silicon nitride, and the first material is selected from a group consisting of a polymer material, $BaF_2$, $CaF_2$, and $MgF_2$.

In some implementations the optical cladding comprises a layer of silica, the two rails comprise silicon, and the first material is selected from a group consisting of a polymer material, $TiO_2$, $BaF_2$, $CaF_2$, and $MgF_2$.

In some implementations the first material may comprise an electro-optic polymer. In some implementations the first material may comprise PMMA.

In any of the above implementations the two rails may be disposed side-by-side on the planar surface, or stacked one over the other in a vertical direction normal to the planar surface. In some implementations wherein the two rails are disposed side-by-side on the planar surface, the first material may form a layer disposed on the planar surface at least in part within the slot.

In any of the above implementations the second region of the slot may comprise a second material having a positive TOC and a smaller refractive index than the rails. In some implementations the first and second materials may form first and second layers, respectively, stacked one over the other within the slot. In some implementations the first and second materials may be disposed side-by-side within the slot.

In some implementations the two rails may be disposed side-by-side, and the slot may comprise a second material having a positive TOC and a smaller refractive index than the rails. In some implementations one of the first and second materials may form a first layer disposed upon the planar surface, and the other of the first and second materials may form a second layer disposed upon the first layer at least in part within the slot. In some implementations the second layer may extend over the two rails. In some implementations the first and second materials may be side-by-side in the slot along a same segment of the slot optical waveguide.

In some implementations the two rails may be stacked one over the other in a direction normal to the planar surface. In some of the implementations one of the first and second materials forms a first layer disposed on the planar surface at least in part in the slot, and the other of the first and second materials forms a second layer disposed, at least, in part, on the first layer in the slot. In some of the implementations the first and second materials are disposed within the slot side-by-side.

In some implementations the two rails may comprise silicon, be stacked one over the other in a direction normal to the planar surface, and be spaced apart by a distance in the range from 10 nm to 80 nm. The second material may comprise at least one of silica or silicon nitride. In some implementations the two rails may comprise silicon, be disposed side-by-side, and be spaced apart by a distance in the range from 50 nm to 210 nm. The second material may comprise at least one of silica or silicon nitride, and a silsesquioxane. In any of these implementations the cladding may comprise at least one of silica or silicon nitride. In any of these implementations the first material may be selected from a group consisting of a polymer material, $TiO_2$, $BaF_2$, $CaF_2$, and $MgF_2$.

In any of the above implementations the first region may have a size in the range from 5% to 90% of a size of the slot in a same direction.

In any of the above implementations the slot optical waveguide may comprise one of a strip-loaded slot optical waveguide and a ridge slot optical waveguide.

In any of the above implementations, the PIC may comprise at least one of: an array waveguide grating comprising the slot optical waveguide, a Mach-Zehnder modulator comprising the slot optical waveguide, and a micro-ring resonator comprising the slot optical waveguide.

An aspect of the present disclosure provides a photonic integrated circuit comprising: a substrate having a planar surface; and a slot optical waveguide on the substrate, the slot optical waveguide comprising an optical core having one or more slots therein, the one or more slots comprising two materials extending along a same segment of the slot optical waveguide, the two materials having thermo-optic coefficients of opposite signs and refractive indices that are smaller than a refractive index of a remaining portion of the optical core adjacent the one or more slots. In accordance with this aspect of the present disclosure, in some implementations the one or more slots may comprise two slots, and the two materials may be disposed in different ones of the two slots.

BRIEF DESCRIPTION OF THE DRAWINGS

Example embodiments are described below in conjunction with the drawings, which are not to scale, in which like elements are indicated with like reference numerals, and in which.

DETAILED DESCRIPTION

Figure 1:
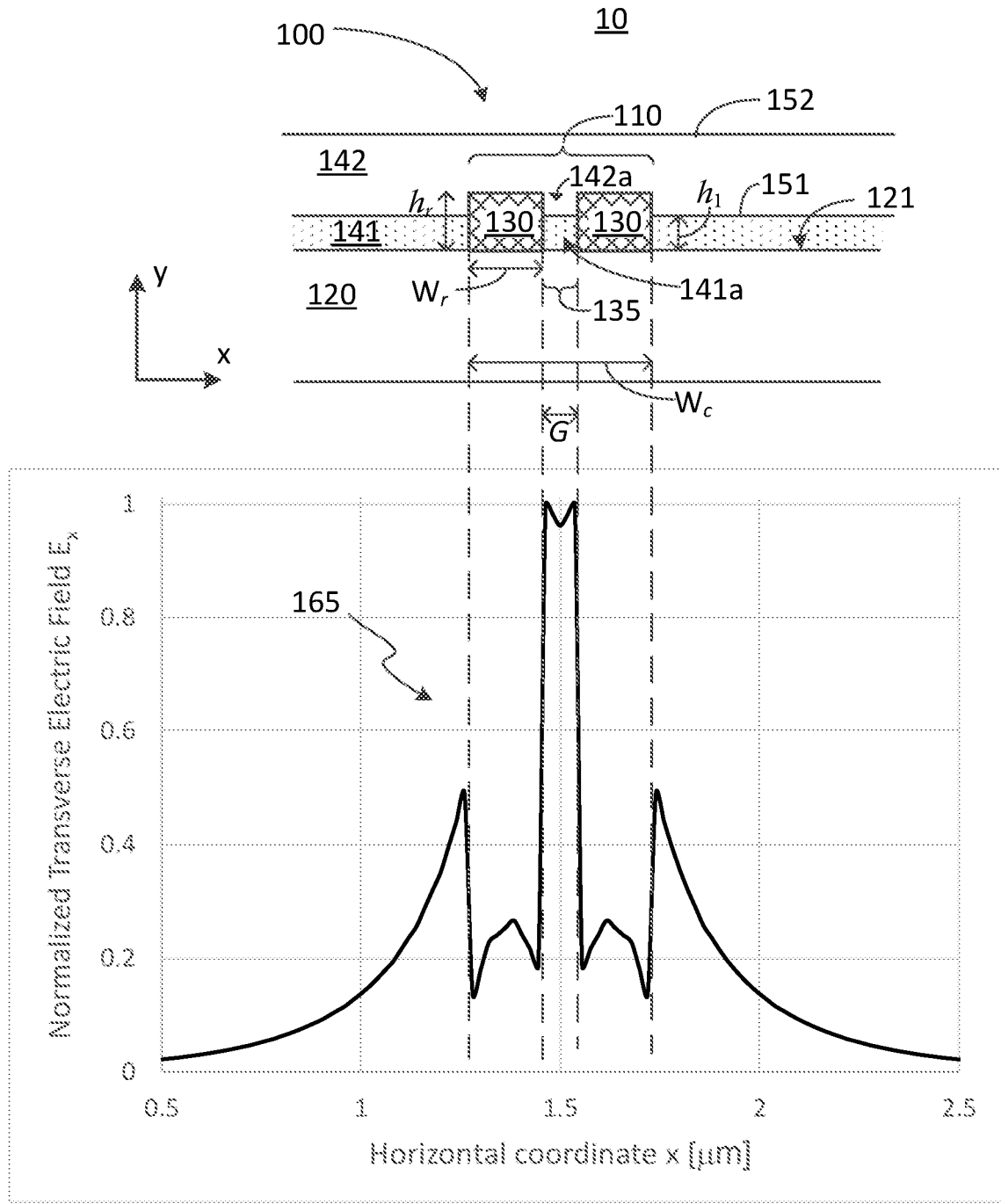
FIG. 1 is a schematic diagram illustrating a cross-section of an example slot optical waveguide with a thermally compensating layer in a portion of the slot (top panel), and a corresponding illustrated distribution of a transverse electrical field of a fundamental TE optical mode across the slot waveguide (lower panel)

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Reference throughout this specification to "one embodiment" or "an embodiment" means that a particular feature, structures, or characteristics may be combined in any suitable manner in one or more embodiments. As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. "Or" is used herein in non-exclusive sense, so that an expression "A or B" does not exclude "both A and B", unless explicitly stated otherwise.

Aspects of the present disclosure relate to photonic integrated circuits (PICs) utilizing slot waveguides formed within or upon planar substrates. A slot optical waveguide is an optical waveguide having a slot of lower index material in its optical core. The relative terms "higher index" and "lower index" are used herein to indicate relative values of refractive indices in an operating wavelength range of an optical device and/or optical waveguide being described. In at least some embodiments the slot may be narrow compared to a relevant operating wavelength, for example narrower than $0.25 \cdot \lambda / n_s$, or in the range from about $0.04 \cdot \lambda / n_s$ to about $0.2 \cdot \lambda / n_s$, where $\lambda$ is a wavelength within the operating wavelength range of the optical waveguide and/or PIC, and $n_s$ is a refractive index of a medium within the slot. In some embodiments characteristic dimensions of the optical core and the slot, and the refractive indices $n_r$, $n_s$ of the materials of the optical core in and adjacent to the slot, respectively, may be such that a substantial fraction, for example more than 10%, of an optical power of a fundamental optical mode supported by the slot waveguide is contained within the slot. In some embodiments the slot waveguide may be configured so that the slot fraction of the optical mode power, termed the slot confinement factor, may be more than 15%. Example embodiments described below relate to slot waveguides in which the ratio $n_r/n_s$ of the refractive index of the rails to the refractive index of a material in the slot is greater than 1.3, or greater than 2; however embodiments where the ratio $n_r/n_s$ is in the range from about 1.1 to about 1.3 are also within the scope of the present disclosure.

Example embodiments described below relate to slot optical waveguides supported by planar substrates, and may have slotted optical cores disposed along planar surface of a substrate. Here "generally planar" or "planar" may encompass slightly bent substrates or surfaces, when a bending-related vertical displacement across the waveguide's width is smaller than a characteristic size of the waveguide in the direction of the displacement. The substrate may have a cladding portion adjacent to the planar surface upon which the slotted core is disposed.

FIG. 1 schematically illustrates a cross-section of a portion of a PIC 10 including a slot optical waveguide (SWG) 100 having features enhancing thermal stability. Unless stated otherwise, cross-sectional views illustrated in the present disclosure may correspond to cross-sections by a plane normal to the direction of light propagation in the optical waveguide. This plane may be described as an (X,Y) plane of a Cartesian coordinate system (X,Y,Z). The direction of light propagation in the waveguide may correspond to the Z-axis of the same coordinate system, and may be referred to as the length direction or the length dimension. The Y-axis may be normal to the plane of the PIC, e.g. normal to a planar surface (121 in FIG. 1) along which the SWG 100 extends, and a corresponding direction or dimension may be referred to as the vertical direction or vertical dimension. The direction or dimension along the X-axis, i.e. in the plane of the PIC and perpendicular to the length direction of the optical waveguides, may be referred to as the transverse direction or transverse dimension.

Referring to FIG. 1, the SWG 100 has a core 110 that includes two rails 130 disposed along a planar surface 121 of an optical cladding 120, extending in the Z-axis direction perpendicular to the (X, Y) plane of FIG. 1. The cladding 120 may also be referred to as the first cladding or the lower cladding, and may be a top portion of a supporting substrate. The rails 130 have a refractive index $n_r$ that is greater than a refractive index $n_{c1}$ of the optical cladding 120, and may be greater than the refractive indices of other immediately adjacent materials or media in the PIC.

In the embodiment of FIG. 1 the rails 130 are both disposed upon surface 121 and extend length-wise side-by-side and are separated by a slot 135 of width G, which may be smaller than an operating wavelength of the SWG 100. In some embodiments the rails 130 may each have a width $W_r$ and a height $h_r$ to define a generally rectangular core having a core width $W_c = 2 \cdot W_r + G$ and a core height $h_r$. Embodiments in which the rails 130 are physically connected to each other at certain locations, such as at the top and/or at the bottom, and the height of the slot 135 is somewhat smaller than the height of the rails 130, are also within the scope of the present disclosure. Here the rail width $W_r$ represents the size of the rails 130 in a direction traversing the two rails 130 and normal thereto, which in the embodiment of FIG. 1 corresponds to the transverse dimension of the waveguide (X-axis). In at least some embodiments the width $W_r$ of each rail 130 may be below a critical waveguide width in the operating wavelength range of the PIC, so that neither of the rails 130 can by itself support the propagation of a guided optical mode in the operating wavelength range of the PIC, but the pair of rails 130 is capable of supporting a guided optical mode when combined to form the optical core 110. In some embodiments the rail width $W_r$ may be smaller than $\lambda/2n_r$, where $\lambda$ is a wavelength of light in the operating wavelength range of the PIC, and $n_r$ is the refractive index of the rails 130. In some embodiments the slot width G may be smaller than $\lambda/2n_r$, where $n_r$ is the refractive index of the rails 130. In some embodiments the slot width G may be smaller than $\lambda/4n_s$. In some embodiments the slot 135 may be narrower than each, or at least one, of the rails 130, $G < W_r$.

Embodiments in which the rails 130 are of different width may also be contemplated and are within the scope of the present disclosure. Although illustrated as rectangular in cross-section, generally the cross-sectional shape of one or both of the rails 130 and/or the slot 135 may vary for different embodiments, or along the waveguide's length; for example in some embodiments one or both rails 130 may have an approximately trapezoidal cross-section, or may have any other suitable shape. The slot width G may stay constant along the SWG 100 or at least some length thereof, but may also vary along at least some length of the SWG 100 in some embodiments.

The SWG 100 further includes a first optical material 141 disposed at least in part in a first region 141a of the waveguide slot 135. The first optical material 141 has a refractive index $n_{s1}$ that is lower than the refractive index $n_r$ of the rails 130, and a negative thermo-optic coefficient (TOC) $\eta_{s1}$. The first optical material 141 may also be referred here as the negative-TOC material. The term "thermo-optic coefficient", or "TOC", refers to the rate $\eta$ of change of a refractive index n of a material with temperature T, i.e. $\eta = dn/dT$. The slot 135 also includes a second region 142a that filled with a material or medium having a non-negative TOC. The first and second regions 141a, 142a extend adjacently in the direction of light propagation in the SWG 100, along a same propagation segment of the SWG 100.

By way of example, PIC 10 may be based on silicon-on-insulator (SOI) technology, and the rails 130 may be formed of a silicon (Si) layer, e.g., disposed over a buried silicon dioxide (silica, $SiO_2$) layer embodying the lower cladding 120 that is supported by a silicon (Si) substrate (not shown in FIG. 1). The first material 141 having a negative TOC may be, for example, titanium dioxide ($TiO_2$) or another suitable material having a negative TOC, including but not limited to $BaF_2$, $CaF_2$, $MgF_2$, and/or polymer materials such as poly-methyl methacrylate (PMMA) and epoxy-based negative photoresist, e.g. SU-8. The second material 142 having a positive TOC may be, for example, silica or silicon nitride ($Si_3N_4$). The core width $W_c$ may be for example in the range from about 400 nm to about 700 nm, the width $W_r$ of the rails 130 may be for example in the range from about 135 nm to about 215 nm, with the slot 135 therebetween having a width in the range from about 50 nm to about 210 nm. The height $h_r$ of the rails 130 may be for example from about 90 nm to about 400 nm.

In the example of FIG. 1, the negative-TOC material 141 is disposed over the cladding 120 forming a first layer 151 that fills the slot 135 up to a height or thickness $h_1$, which may be a fraction of the height $h_r$ of the slot 135. The first layer 151 may also be referred to as the negative-TOC layer. In some embodiments the first layer 151 may be confined within the slot 135. In some embodiments the first layer 151 may extend outside of the slot 135. In some embodiments the first layer 151 may extend outside of the optical core 110, as illustrated in FIG. 1. The second region 142a of the slot 135 may be filled with a second material 142 having a positive TOC $\eta_{s2}$ and a refractive index $n_{s2}$ that is lower than the refractive index $n_r$ of the rails 130. In some embodiments the second material 142 may form a second layer 152 that is disposed in the slot 135 over a first layer 151 formed by the negative-TOC material 141. In some embodiments the second layer 152 may extend over the rails 130 forming a second, or top, cladding. In some embodiments the second material 142 may be confined within the slot 135. In some embodiments a layer of a different material (not shown) may be disposed over the second material 142 within the slot, and over the rails 130, to form a top cladding layer.

The combined width $2W_r$ of the rails 130, and/or the core width $W_c$, is large enough to support a guided optical mode of the SWG 100 for a given core height $h_r$ and given refractive indices $n_r$, $n_{c1}$, and $n_{s1}$, and $n_{s2}$. If the refractive index contrast between the rails 130 and the slot 135 is high enough, a significant fraction of the optical power of a guided optical mode of the SWG 100 may be confined within the slot. An example distribution 165 of a transverse component $E_x$ of the electrical field of a fundamental optical TE mode of the SWG 100 is illustrated in the lower panel of FIG. 1 as a function of the transverse coordinate x. In this example the transverse electrical component $E_x$ is about normal to the rail-slot interface, and experiences a jump by a factor of $a=(n_r/n_s)^2$ at the rail-slot and rail-cladding interfaces. The optical field distribution 165 represents simulation results for an example SWG 100 with two rails 130 made of silicon (Si), $n_r=3.45$, that have the width $W_r=185$ nm and the height $h_r=220$ nm, and are disposed at a distance G=110 nm from each other over a layer of silica (silicon dioxide, $SiO_2$), $n_{c1}=1.45$, and the same or similar material in the slot between the rails, i.e. $n_s \cong 1.45$, providing an a-factor of about 5.4-5.6. The wavelength $\lambda=1550$ nm, which is typical for telecommunication applications, is assumed.

As can be seen from the lower panel of FIG. 1, in the example embodiment described above the confinement of optical field of the fundamental optical TE mode in the slot 135 is relatively strong, and therefore materials within the slot may significantly affect the waveguide's behavior as a function of temperature T. Therefore, it may be possible to select a material or materials within the slot 135 so that the SWG 100 exhibits a desired behavior when its temperature T changes. For example, in at least some embodiments the thickness $h_1$ of the first layer 151 having a negative TOC may be selected so as to at least partially compensate the effect of a positive TOC in other parts of the slot optical waveguide 100 upon an effective refractive index $n_{eff}$ of the SWG 100. Conversely, the thickness $h_2=(h_r-h_1)$ of the positive-TOC layer 142 may be selected to at least partially offset the effect of the negative-TOC layer 141 in the slot on the effective refractive index $n_{eff}$ of the SWG 100 as function of temperature. The term "effective refractive index" refers to a ratio of the speed of light in vacuum c to the phase velocity of a guided optical mode in a relevant optical waveguide segment of the PIC under consideration, such as in the SWG 100, at an operating guided wavelength. The behavior of the effective refractive index $n_{eff}$ as a function of temperature, $n_{eff}(T)$, may be of importance in various PICs such as those utilizing interference between two or more optical signals propagating along a same optical waveguide or different optical waveguides, as it may affect relevant phase delays between such interfered optical signals.

In some embodiments, the thicknesses of the negative-TOC layer 151 may be selected so that e.g. an increase in the refractive index in other parts of the SWG 100 due to an increase in the temperature T of the SWG 100 is at least partially compensated by a corresponding decrease in the refractive index $n_{s1}$ of the negative-TOC layer 151, so that the effective refractive index $n_{eff}$ experienced by the optical mode 165, remains substantially unchanged, or its sensitivity to temperature variations is reduced by at least 3 times, or at least 5 times, or even at least 10 times. In some embodiments, athermal or nearly athermal operation of SWG 100 may be achieved for operating wavelengths thereof.

In an ultimate case when the optical field confinement within the slot 135 is close to 100%, i.e. when the field outside of the slot may be almost negligible, an approximately athermal operation of the SWG 100 may be achieved by selecting the thickness $h_1$ so that the following equation (1) holds:

$$h_1 \cdot n_{s1} \cdot \eta_{s1} + h_2 \cdot n_{s2} \cdot \eta_{s2} = 0. \quad (1)$$

Here $h_2$ is the thickness or height of the second material 142 within the slot 135, which in the illustrated embodiment may be equal to $(h_r-h_1)$, $n_{s1}$ and $n_{s2}$ are the refractive indices of the materials 141 and 142, respectively, and $\eta_{s1}$ and $\eta_{s2}$ are the TOCs of the materials 141 and 142, respectively; here $\eta_{s1}$ is negative and $\eta_{s2}$ is positive. By way of example, in an embodiment where the negative-TOC material is poly-methyl methacrylate (PMMA) having $n_{s1}=1.48$ and $\eta_{s1}=-1.3 \cdot 10^{-4}$, and the second material silica having $n_{s2}=1.45$ and $\eta_{s2}=1 \cdot 10^{-5}$, the approximation of equation (1) yields $h_1 \cong 0.07 \cdot h_r$. Accordingly, filling only about 7% of the slot 135 with the PMMA could be sufficient in to provide thermal compensation for an SWG, provided that the optical confinement within the slot is close to 100%. However, in at least some practical embodiments the optical confinement within the slot may be significantly lower than 100%, for example below 50%, or in another example in the range of 15-35%, and the thickness $h_1$ of the negative-TOC material or layer within the slot 135 that provides a desired degree of thermal compensation may differ from that defined by equation (1). In embodiments where the materials of the rails 130, lower optical cladding 120, and other optical claddings that may be present, have positive TOCs, the thickness $h_1$ of the negative-TOC material or layer within the slot 135 that provides a desired degree of thermal compensation may be greater than that defined by equation (1). By way of non-limiting example, in some embodiments the negative-TOC material may occupy a fraction of slot volume, as may be defined by the ratio $h_1/h_r$, in the range from about 5% to about 90%, or in the range from about 50% to about 80%, in some embodiments. One skilled in the art would be able to determine the desired thickness $h_1$ for a particular SWG geometry and materials based on known refractive index and TOC values for the SWG materials, for example using commercially available software packages for computing an optical mode field distribution in an optical waveguide and an associated effective refractive index $n_{eff}$ of a relevant optical mode of the SWG.

In some embodiments, the fraction of the slot's volume occupied by the negative-TOC material 141, e.g. as defined by the ratio $h_1/h_r$, may be chosen so that an effective TOC $\eta_{eff}$ of the corresponding SWG 100, $\eta_{eff}=dn_{eff}/dT$, is at least 3 times smaller in magnitude, or at least 5 times smaller, or at least 10 times smaller, than the TOC of at least one of the first material 141 or the second material 142 within the slot 135. In the example embodiment of SWG 100 of FIG. 1 with silicon-based core 110 having the parameters $h_r=220$ nm, $W_r=185$ nm, G=110 nm as described above, and a top $SiO_2$ layer 152 disposed over the PMMA layer 151, the PMMA layer's height $h_1$ may be about 148 nm, which is about 67.5% of the slot height $h_r$. In accordance with at least some estimations, this may reduce the temperature sensitivity of the effective TOC of the optical waveguide to values of about $10^{-6}$ T$^{-1}$, which favorably compares to, and is smaller in magnitude than the Si TOC of approximately $1.8 \cdot 10^{-4}$, PMMA TOC of approximately $-1.3 \cdot 10^{-4}$ K$^{-1}$ and the TOC of $SiO_2$ of approximately $+1 \cdot 10^{-5}$ K$^{-1}$.

FIG. 1 illustrates an example embodiment wherein the negative-TOC material forms a layer filling a lower portion of a slot between two transversely disposed rails, and also forms a portion of the optical cladding of the slot optical waveguide. Slot optical waveguides with thermally compensating materials in the slot or slots, which balance out thermally-induced changes in the optical properties of other waveguide materials within the slot and/or outside of the slot, may have a variety of configurations, including waveguide configurations that differ in the position of the negative-TOC material within the slot, the presence or absence of the negative-TOC material outside of the slot, the orientation of the slot within the core, the number of the slots within the core, and/or the materials and configuration of the optical cladding or claddings.

Figure 2A:
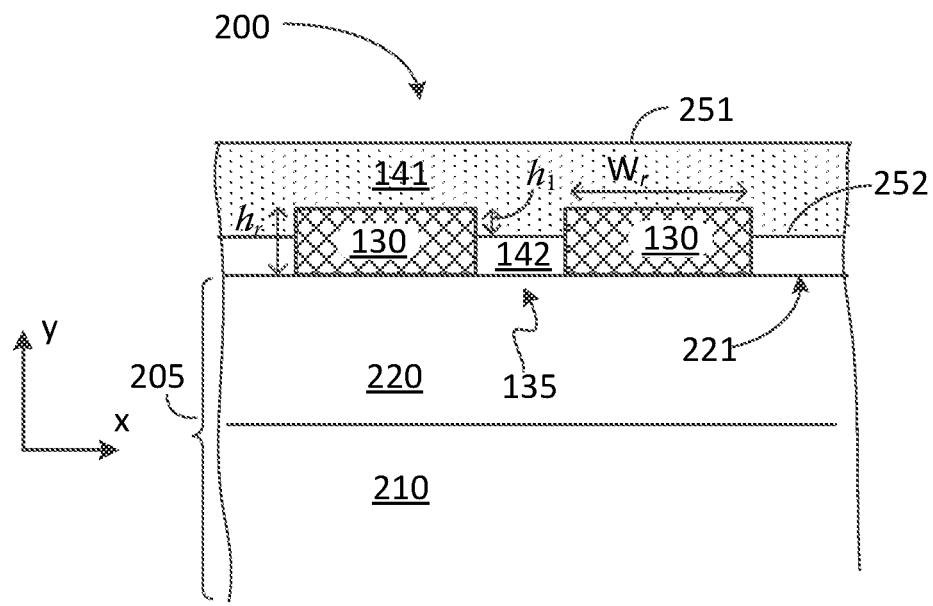
FIG. 2A is a schematic cross-sectional view of an example slot optical waveguide with an optical core having a negative-TOC layer as a top layer within the slot extending over the optical core.

FIG. 2A illustrates an example SWG 200 that may be viewed as a variation of SWG 100 of FIG. 1, in which the negative-TOC material 141 occupies a top portion of a slot 135, and is disposed over a layer 252 of the second material 142 that may have a positive TOC. The materials 141 and 142 have a lower refractive index than the material of the rails 130. Elements of SWG 200 that are functionally similar to corresponding elements of SWG 100 are labeled in FIG. 2A with the same reference numerals. The rails 130 are disposed upon a planar surface 221 of an optical cladding portion 220 of a substrate 205, and may be generally as described above with reference to FIG. 1. The optical cladding portion 220 may be generally as described above with reference to the optical cladding 120. The optical cladding 220 is a layer of dielectric material of lower refractive index than the material of the rails 130 and is disposed over a substrate base 210. By way of example, the cladding 220 may be a layer of silicon dioxide disposed over a silicon substrate base 210, and the rails 130 may be formed of a silicon layer of a SOI wafer. In the embodiment illustrated in FIG. 2A, the negative-TOC material 141, which may be generally as described above with reference to SWG 100 of FIG. 1, forms a top layer 251, which may extend over the rails 130 forming a top cladding layer 251. In some embodiments, the negative-TOC material 141 may be confined within the top portion of the slot 135. In some embodiments a top cladding layer of a positive-TOC material (not shown) may be disposed over the negative-TOC material 141 confined within the slot 135. In some embodiments the cladding 220 and the layer 252, which is disposed over the cladding 220 and fills the lower portion of the slot 135, may be of the same material; for example, they may be both formed with silicon dioxide. In some embodiments the cladding 220 and the layer 252 may be of different materials; for example one may be formed with silicon dioxide and another—with silicon nitride. In some embodiments the layer 252 may be formed, at least partially, by the resist used for lithography such as, for example, hydrogen silsesquioxane (HSQ). The HSQ layer may be left after photolithography processing to define the rails 130; once baked, HSQ has optical properties similar to $SiO_2$, and may behave as the positive TOC material in the SWG 200. The thickness $h_1$ of the negative-TOC material 141 within the slot 135 may be such so as to reduce the effect of temperature changes on the effective refractive index of the optical waveguide in the operating wavelength range of the PIC comprising the optical waveguide. By way of example, in some embodiments wherein the negative-TOC material 141, such as PMMA, extends over silicon rails 130 to form a top cladding as illustrated in FIG. 2A, the thickness $h_1$ of the negative-TOC material 141 within the slot 135 may be in the range from about 5% to about 30% of the corresponding slot dimension, e.g. its height $h_r$. Embodiments of the SWG 200 in which the fraction of the slot volume occupied by the negative-TOC material 141 is in excess of 30% are also within the scope of the present disclosure. In some embodiments, the thickness $h_2$ of the positive-TOC layer 142 may be selected to offset the effect of the negative-TOC material 141 in the slot.

Figure 2B:
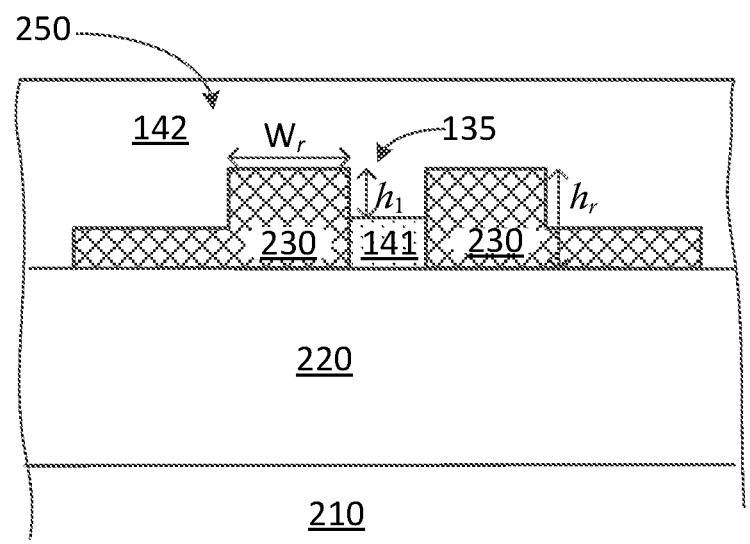
FIG. 2B is a schematic cross-sectional view of an example slot optical waveguide with a negative-TOC layer localized within the slot.

FIG. 2B illustrates an example SWG 250, which may be viewed as a variation of SWG 100 with two rails 230 shaped to form a strip-loaded slot optical waveguide, having sections of height $h_r$ and width $W_r$ facing each other across a slot 135 of a width G, and thinner sections extending in opposite directions from the slot 135. The slot 135 may be partially filled with the negative-TOC material 141 as described above to form a negative-TOC layer. A layer of the second material 142 may be disposed at least in part within the slot 135 over the negative-TOC layer 141, and optionally over the rails 230 to function as a top cladding. The materials 141 and 142 have a lower refractive index than the material of the rails 230. The thickness $h_1$ of the negative-TOC layer 141 may be chosen to at least partially compensate the effect of a positive TOC of the lower optical cladding 220, the rails 230, and the second material 142 upon the effective refractive index of the SWG 250, and may be as described above with reference to FIG. 1. In embodiments where the rails are formed of a semiconducting material such as silicon and the optical properties of the negative-TOC material 141 or other material within the slot 135 may be changed by an applied electrical signal, the thinner sections of the rails 230 may be used as electrical conducting paths to provide the electrical signals to the material within the slot 135.

Figure 3A:
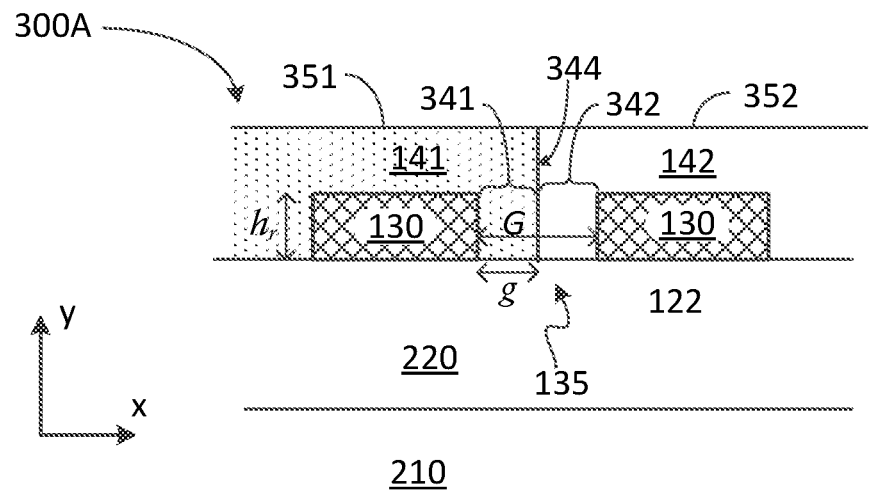
FIG. 3A is a schematic cross-sectional view of an example slot optical waveguide having layers with TOC of opposite signs adjacent to different rails extending side-by-side within the slot.

FIG. 3A illustrates an example SWG 300A that may be viewed as a modification of SWG 100 or SWG 200 in which the materials 141 and 142 having TOC of opposite sign are disposed side by side at least in part within the slot 135, extending over different portions of the cladding 220. Again, the materials 141 and 142 have a lower refractive index than the material of the rails 130. In the illustrated embodiment, the slot portion of the negative-TOC material 141 is contained within a first region 341 of the slot 135, which is adjacent to one of the rails 130 and extends from said rail to a distance g into the slot 135, with the distance g being smaller than the distance G to the other rail 130. The slot portion of the positive-TOC material 142 is disposed within a second region 342 of the slot 135 that is adjacent to the other rail 130, abutting the first material 141 along an interface 344 that is spaced apart from either of the rails 130 and may be vertically oriented. The materials 141, 142 may form transversely-adjacent layers 351 and 352. In some embodiments, layers 351, 352 may extend over different ones of the rails 130, and may form a top cladding. In some embodiments at least one of the materials 141, 142 may be confined within the slot 135. In some embodiments the rails 130 may be disposed directly upon the optical cladding 220. In some embodiment the interface 344 between the positive-TOC and negative-TOC materials 141, 142 may extend into the lower optical cladding. In some embodiments the lower optical cladding 220 and one of the layers 351, 352 may be of the same material. The width g of the first slot region 341 occupied by the negative-TOC material 141 may be selected to reduce the effect of temperature changes on the effective refractive index of the slot optical waveguide in the operating wavelength range of the PIC comprising the optical waveguide. In some embodiments it may be in the range from about 5% to about 90% of a corresponding slot dimension, e.g. of its width G. By way of example, in some embodiments with silicon rails 130 as described above and a layer of PMMA as the negative-TOC material 141 extending over a portion of the optical waveguide core as illustrated in FIG. 3A, the width g may be in the range from about 0.2 G to about 0.6 G.

Figure 3B:
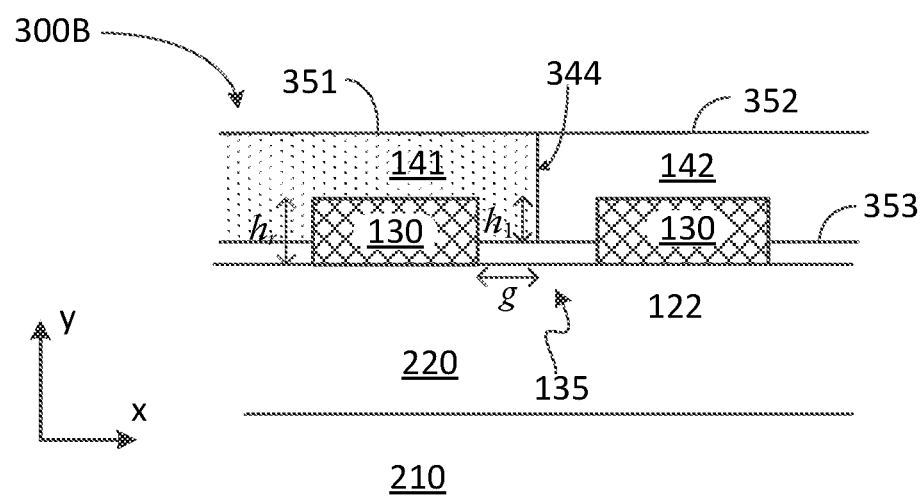
FIG. 3B is a schematic cross-sectional view of an example slot optical waveguide having a negative-TOC material disposed within the slot side-by-side and over positive-TOC material or materials.

FIG. 3B illustrates an example SWG 300B that may be viewed as a modification of SWG 300A, in which the negative-TOC material 141 is disposed over a layer 353 of a positive-TOC material. The material of the layer 153 may be for example as described above with reference to layer 252 in FIG. 2A, and may or may not differ from the second material 142. In this embodiment the negative-TOC material 141 occupies a region of the slot 135 of width g<G and height $h_1<h_r$. In some embodiments either the width g or the height $h_1$ of this region, or the size of the complementary slot region occupied by the positive-TOC materials, may be selected to lessen the effect of temperature changes on the effective refractive index of the slot optical waveguide in the operating wavelength range thereof to a suitably low level.

Figure 4A:
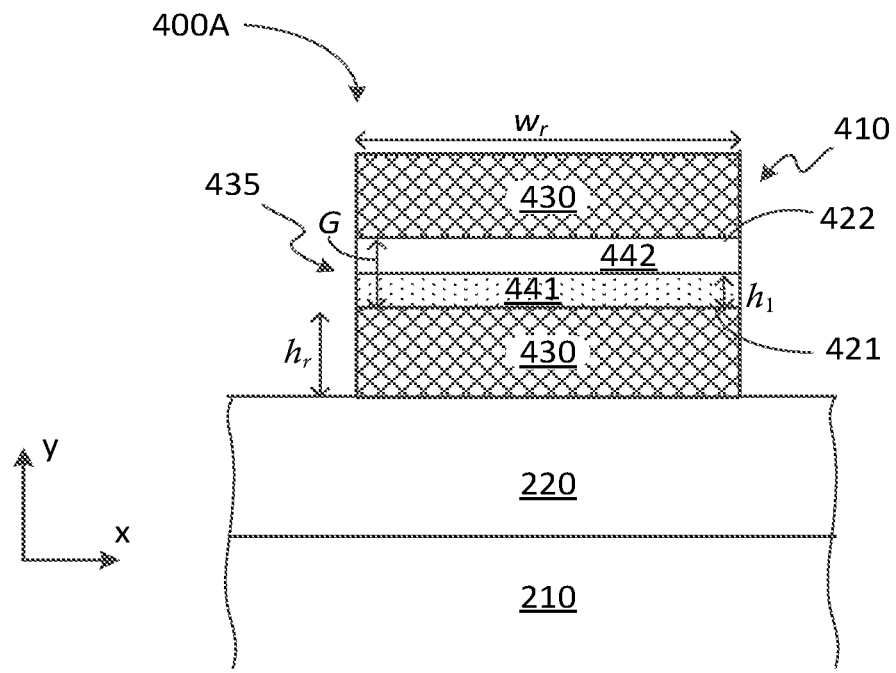
FIG. 4A is a schematic cross-sectional view of an example slot optical waveguide with horizontally stacked rails separated by lower index layers having TOC of opposite sign therebetween.
Figure 4B:
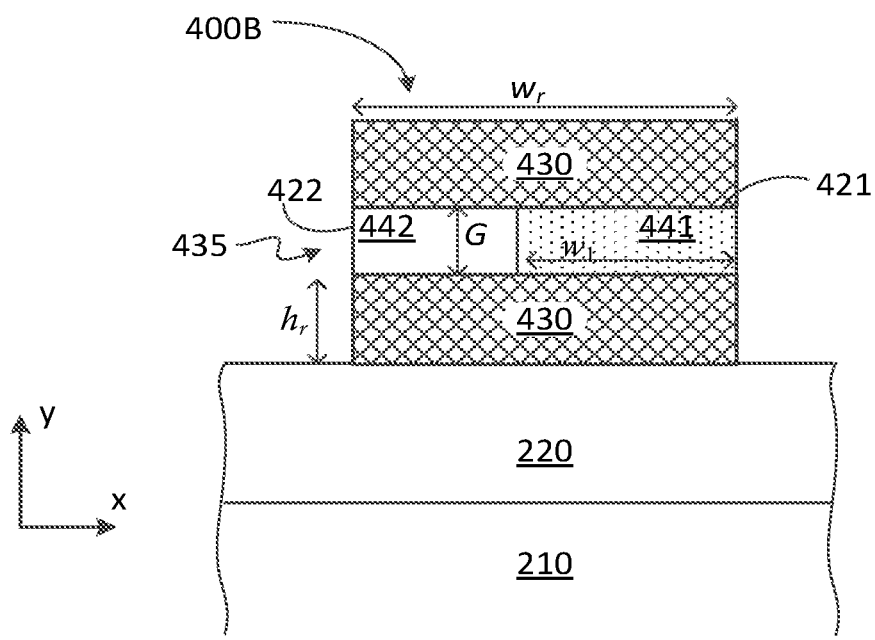
FIG. 4B is a schematic cross-sectional view of an example slot optical waveguide with horizontally stacked rails separated by materials having TOC of opposite signs positioned side-by-side in the horizontal slot therebetween.

FIGS. 4A and 4B illustrate example SWGs 400A and 400B in which rails 430 are vertically stacked, with a space therebetween forming a thin slot 435, which is partially filled with a negative-TOC material 441. The material 441 has a lower refractive index than the material of the rails 430. In these embodiments, one of the rails 430 is disposed upon a planar top surface of the optical cladding 220, and a second one of the rails 430 is disposed over and above the slot 435. The rails 430 are spaced apart in the vertical direction by a distance G therebetween, of the slot 435. The SWG 400A is capable of supporting at least one guided optical mode in the operating wavelength range of a PIC comprising the SWG 400A. In this and similar configurations, the at least one supported guided optical mode may be a fundamental optical TM mode, with the vertical E-filed component $E_y$ experiencing a discontinuity at the slot-rail interfaces. The distance G between the rails 430, which may also be referred to as the (first) slot size or the slot thickness, may be smaller than a wavelength λ in the operating wavelength range of the PIC, and in at least some embodiment may be smaller than $λ/4n_s$, where $n_s$ is the refractive index of a material in the slot.

Similarly to the rails 130, each of the rails 430 may have a size that is insufficient to support the propagation of a guided optical mode therein. In the examples illustrated in FIGS. 4A-4B, the rails 430 have each a rectangular cross-section with a transverse (X-axis) dimension $W_c$ and a vertical (Y-axis) dimension $h_r$. The transverse (X-axis) dimension $W_c$ of the rails 430 defines the width of the optical waveguide core 410, with the height $h_c$ of the optical waveguide core 410 being defined by the sum of the vertical dimensions of the rails 430 and the distance G therebetween, i.e. $h_c=(2·h_r+G)$ in embodiments with two rails 430 of equal size. In some embodiments, the two rails 430 may differ in size in the vertical (Y-axis) and/or transverse (X-axis) directions. The slot 435 may extend transversely across the full width of the optical core 410. Embodiments in which the slot 435 has a somewhat different orientation and/or extends only to a fraction of the core width $W_c$ are also within the scope of the present disclosure.

The negative-TOC material 441 may occupy a first region 421 of the slot 435, and in the operating wavelength range of the corresponding PIC has a TOC $η_1<0$; the negative-TOC material 441 may be, for example, as described above with reference to the negative-TOC material 141. A second region 422 of the slot 435 may contain material 442 having a non-negative TOC $η_2$, i.e. $η_2≥0$. The first and second slot regions 421, 422 may adjacently extend, i.e. next to each other, along a common length of the SWG 430. In example embodiments described below, the second region 422 of the slot 435 is filled with an optical material 442 having a positive TOC $η_2$, i.e. $η_2>0$, and a lower refractive index than the material of the rails 430. In some embodiments the size of the first region 421 containing the negative-TOC material 441 relative to the size of the slot 435 may be adjusted to provide a desired degree of thermal compensation of a relevant system parameter. In some embodiments the relative size of the first region 421 occupied by the negative-TOC material 441 may be chosen so that the effect of a change in the refractive index of the negative-TOC material 441 due to a change in temperature T upon the effective refractive index of the optical waveguide at least partially offsets the effect of opposite-sign changes in the refractive index in other parts of the optical waveguide.

In some embodiments the materials of the rails 430, and the first and second 1 materials 441, 442 may be as described above with reference to the rails 130 and materials 141, 142 of FIG. 1. By way of non-limiting example, the rails 430 may be formed from two silicon layers, which may be disposed over a layer of $SiO_2$ forming the optical cladding 220, with the rail width $W_c$ in the range from about 400 nm to about 700 nm, the rail height $h_r$ in the range from 70 nm to 105 nm, and the gap size G in the range from 10 nm to 80 nm. In an example embodiment, $W_c$ may be about 480 nm, $h_r$ about 85 nm, and G about 50 nm.

FIGS. 4A and 4B illustrate example SWG 400A and 400B, respectively, in which the first and second materials 441, 442 are confined within the slot 435. In some embodiments the waveguide's optical core 410 may form a ridge upon the plane top surface of the lower optical cladding 220 in the absence of any solid top cladding material above or at the sides of the waveguide's optical core 410. In some embodiments some optical cladding material may be provided above and/or at the sides of the waveguide's optical core 410 to form a buried-ridge slot optical waveguide. In some embodiments one or both of the materials 441, 442 may extend outside of the slot 435 and function as side and/or top optical claddings for the waveguide's optical core 410.

In FIG. 4A, the negative-TOC material 441 and the second material 442 may be in the form of vertically-stacked layers disposed one over the other. The thickness $h_1$ of the negative-TOC layer 441 may be a fraction of the thickness G of the slot 435, for example in the range of 0.1·G to 0.9·G, or in the range of 0.3·G to 0.9·G in some embodiments. In some embodiment the thickness $h_1$ of the negative-TOC layer 441 may be selected to provide a desired degree of thermal compensation to the optical waveguide, generally as described above. Although in FIG. 4A the negative-TOC layer 441 is shown as the lower layer in the slot 435, in other embodiments it may be disposed over the second layer 442 having a positive TOC. By way of example, the rails 430 may each have a width $W_c$ of approximately 480 nm and a height $h_r$ of 85 nm, with a 50 nm thick slot 435 therebetween having a $h_1=37$ nm thick PMMA layer 441 in the slot.

In FIG. 4B, the negative-TOC material 441 and the second material 442 are disposed side-by-side over different portions of the lower rail 430, in the slot regions 421 and 422, respectively that may be positioned adjacently in the transverse direction. The size $w_1$ of the negative-TOC slot region 421, which in this example represents its width within the slot in the transverse direction, may be a fraction of the width $W_c$ of the slot 435, for example in the range from about $0.1·W_c$ to about $0.9·W_c$. In some embodiment the fraction $w_1/W_c$ of the slot 435 which contains the negative-TOC layer 441 may be selected to provide a desired degree of thermal compensation, generally as described above. By way of example, in embodiments with the rails 430 formed of silicon as described above, $SiO_2$ as the positive-TOC material 442, and PMMA as the negative-TOC material 441, the width $w_1$ in the range from about 0.05 $W_c$ to about 0.3 $W_c$ may provide an enhanced thermal compensation. The width $w_1$ greater than 0.3 $W_c$, for example in the range from 0.3 $W_c$ to 0.8 $W_c$, may also be used, for example in embodiments wherein PMMA or another electro-optic polymer with negative TOC is used within the slot 435 for electrical control of the SWG 400B.

Figure 5A:
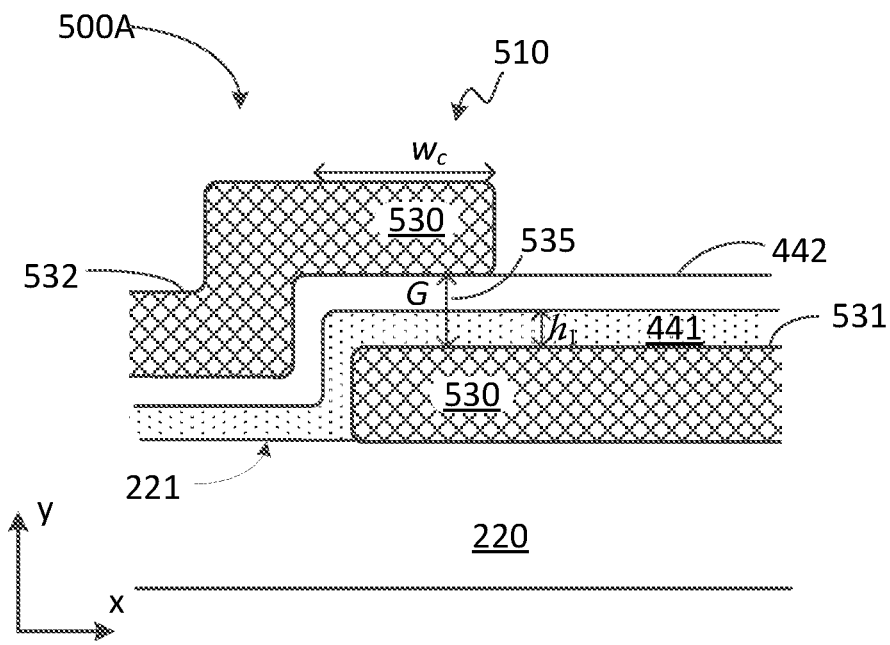
FIG. 5A is a schematic cross-sectional view of an example slot optical waveguide with horizontally stacked rails extending transversely away from the waveguiding optical core and separated by layers having TOC of opposite signs.
Figure 5B:
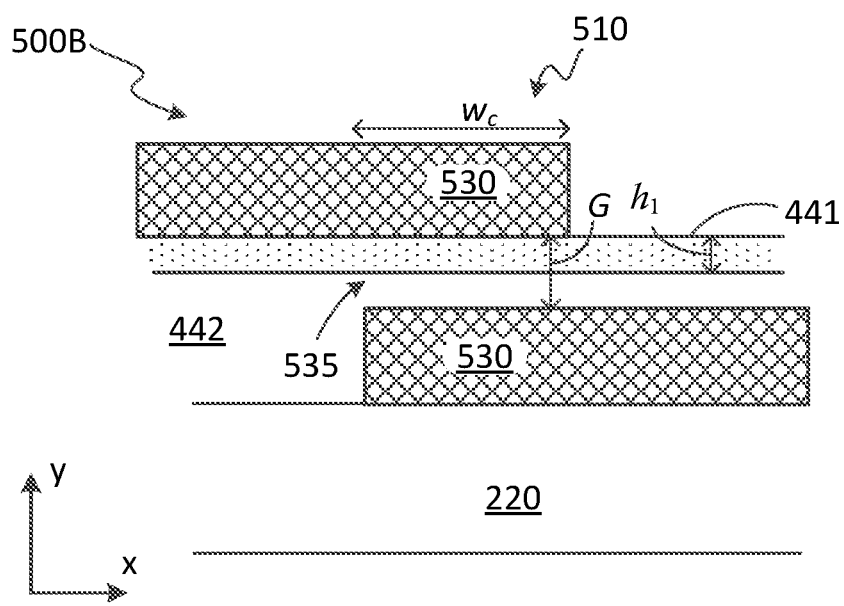
FIG. 5B is a schematic cross-sectional view of an example slot optical waveguide with horizontally stacked planar rails extending transversely away from the waveguiding optical core and separated by layers having TOC of opposite signs.

FIGS. 5A and 5B illustrate example SWG 500A and 500B, each of which may be viewed as a variation of SWG 400A in which at least one of the rails 530 extends transversely away from a waveguiding core. A rail extension in the transverse direction may for example provide an electrical path to a material in the slot and/or to the optical core portions of the rails 530. In the illustrated examples, a waveguide's optical core 510 is formed by overlapping edge portions 530 of two layers 531 and 532, which extend in the waveguide length direction (Z-axis normal to the plane of FIG. 5). The overlapping edge portions 530 of the layers 531, 532, which may be referred to as the rails 530, are vertically spaced by the sub-wavelength distance G to form a slot 535 therebetween.

In the embodiment of FIG. 5A, a layer of negative-TOC material 441 having a thickness $h_1 < G$ is disposed upon the lower layer 531, and may extend in a transverse direction beyond its edge portion and onto the cladding 220. A layer of positive-TOC material 442 having a thickness $h_2 = (G - h_1)$ is disposed over the layer of negative-TOC material 441, at least in part within the slot 535. In the embodiment of FIG. 5B, a layer of negative-TOC material 441 having a thickness $h_1 < G$ is disposed upon a layer of positive-TOC material 442, which has a thickness of $h_2 = (G - h_1)$ within the slot 535 but may have a greater thickness outside of the slot, i.e. away from the edge of the lower rail 530, providing a flat foundation for the negative-TOC material 441 and the upper rail 530. In both embodiments the thickness $h_1$ of the negative-TOC layer 441 may be selected to offset the effect of the positive TOC of all other adjacent material on the effective refractive index of the SWG 500 in the operating wavelength range of the PIC comprising in the operating temperature range. In some embodiments, the thickness $h_2 = (G - h_1)$ of the positive-TOC layer 442 may be selected to offset the effect of the negative-TOC layer 441 in the slot. It will be appreciated that each one of the SWG 500A and SWG 500B may be modified to have the layers of the first and second materials 441, 442 disposed in a different order.

Figure 6B:
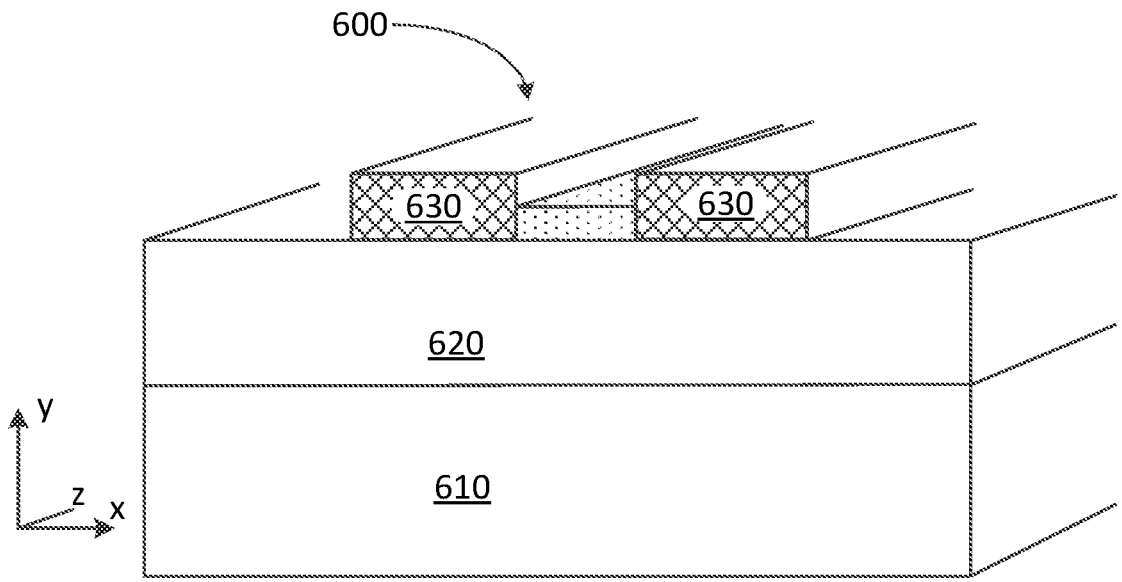
FIG. 6B is a schematic perspective view of the example slot optical waveguide of FIG. 6A.
Figure 6A:
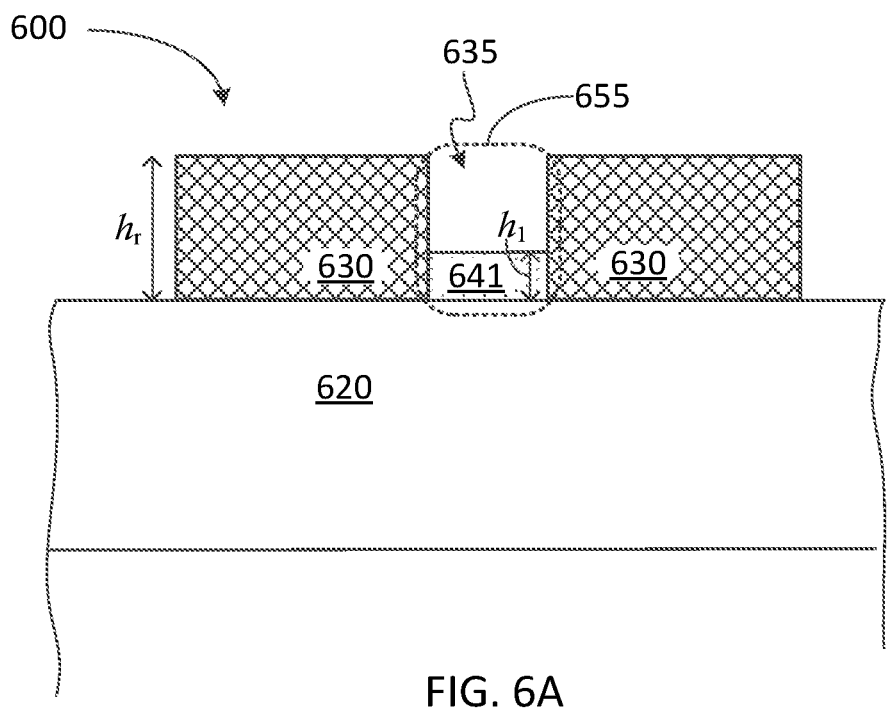
FIG. 6A is a schematic cross-sectional view of an example ridge slot optical waveguide with the slot partially filled with a negative-TOC layer and without top cladding.

FIGS. 6A and 6B illustrate an example SWG 600 having an optical core formed with two rails 630 disposed over a cladding 620 at a sub-wavelength distance from each other, forming a narrow slot 635 therebetween. FIG. 6A illustrates a partial cross-section of the SWG 600 by a plane (X, Y) that is normal to the direction of light propagation in the waveguide (axis Z in FIG. 6B, also referred to here as the waveguide length direction). FIG. 6B illustrates a 3D perspective view of the SWG 600, and also schematically shows a base substrate 610. The rails 630, their spacing G, and the cladding 620 may be generally as described above with reference to the rails 130 and the claddings 120 and 220. A layer of a negative-TOC material 641 is disposed over the cladding 620 at least in part within the slot 635, partially filling the slot to a fractional height $h_1$ that may be a fraction of the slot height $h_r$. The material 641 has a lower refractive index than the material of the rails 630. In this example, the top portion of the slot 635 may remain absent of any dielectric material, and may for example contain air or any other non-solid material that has a negligibly small TOC compared to the TOC of the cladding 620 and the rails 630. An optical mode 655 supported by the SWG 600 may be partially confined within the slot 635 as described above, but may also partially penetrate into the lower cladding and the rails 630, which may have a positive TOC. The thickness $h_1$ of the negative-TOC layer may be selected to offset the effect of that positive TOC on the effective refractive index of the SWG 600 in the operating wavelength range of a PIC comprising the SWG 600.

Figure 7:
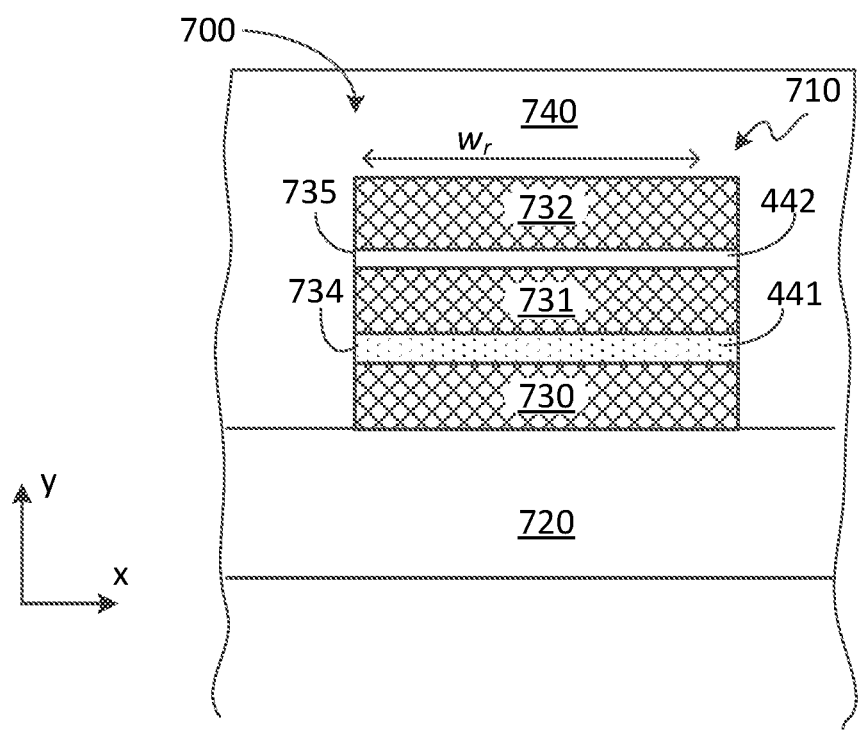
FIG. 7 is a schematic cross-sectional view of an example ridge optical waveguide with horizontally stacked rails spaced by multiple slots that contain materials having TOC of opposite sign.

With reference to FIG. 7, in some embodiments a waveguiding optical core of an SWG may include two or more slots, which may contain materials having TOC of opposite signs, wherein these materials have lower refractive indices than the materials of rails of the optical core. FIG. 7 schematically illustrates an example SWG 700 that includes a waveguiding optical core 710 having two narrow slots 734 and 735. The waveguiding optical core 710 is formed with vertically stacked rails 730, 731, and 732, which are disposed over an optical cladding 720 and are spaced from each other by sub-wavelength distances, for a guiding optical wavelength, to form the narrow slots 734, 735. In other embodiments the waveguiding optical core 710 may include more than three rails spaced to form more than two slots. The first layer 730 may be disposed directly over the optical cladding 720 having a lower index of refraction than the rails 730-732. The optical cladding 720 may be a top portion, for example a top layer, of a substrate supporting the waveguiding optical core 710. The rails 730, 731, and 732 may overlap over a width $w_r$ in the transverse direction (X-axis), which may define the width of the waveguiding optical core 710. In some embodiments a top optical cladding 740 having a lower refractive index than the rails 730, 731, and 732 may be provided over the waveguiding optical core 710. In some embodiments the rails 730, 731, and 732 may be of a same high-index material. In some embodiments at least one of the rails 730, 731, and 732 may be of a different material than at least another one of the rails 730-732.

In some embodiments at least one of the slots 734, 735 may contain a first material 441 having a negative TOC, and at least the other one of the slots 734, 735 may contain a second material 442 having a positive TOC. In the illustrated example, the first slot 734 is filled with the negative-TOC material 441, and the second slot 735 is filled with the positive-TOC material 442. In some embodiments each of the slots 734, 735 may contain both the negative-TOC material 441, and the positive-TOC material 442, for example as described above with reference to FIGS. 4A and 4B. In at least some embodiments, each of the first and second materials have a lower refractive index that each of the rails 730-732. Layer thickness of the materials in the slots, and/or the slot thicknesses, may be selected to reduce the optical waveguide's sensitivity to temperature changes in an operating temperature and wavelength ranges of the PIC comprising the optical waveguide.

Figure 8:
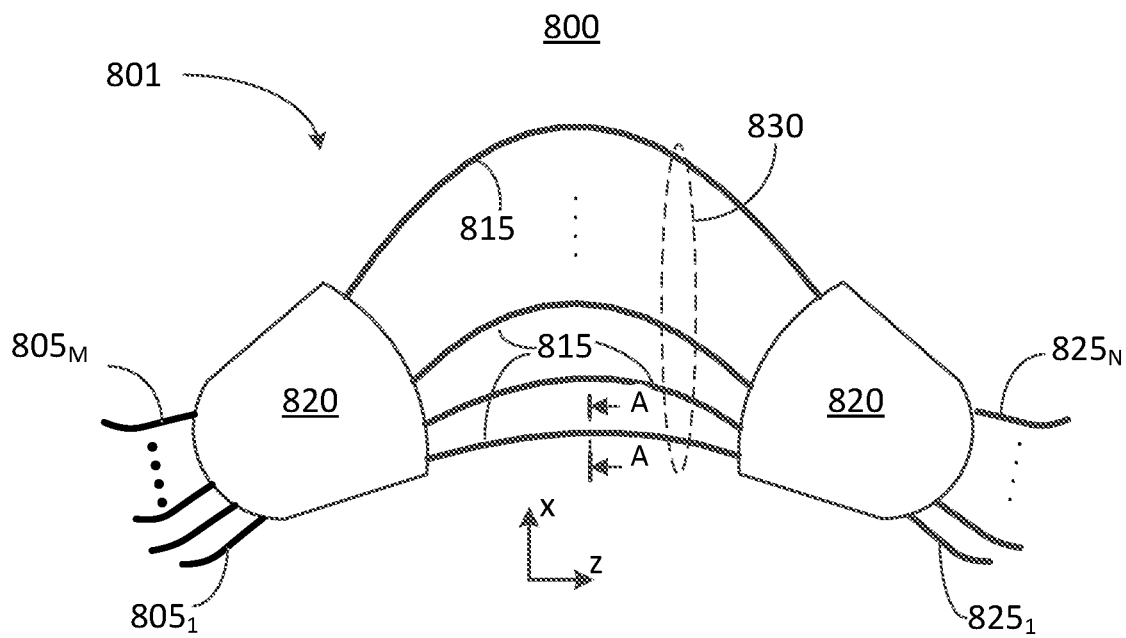
FIG. 8 is a schematic plan view of a PIC implementing an integrated array waveguide grating (AWG) device having with thermally-compensated slot optical waveguides in the AWG.
Figure 9:
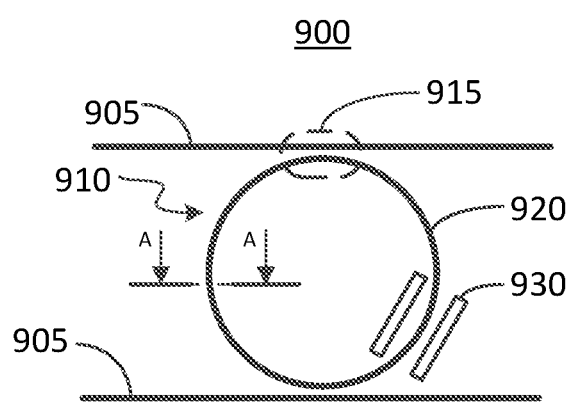
FIG. 9 is a schematic plan view of a PIC including a micro-ring optical device formed with a thermally-compensated slot optical waveguide.
Figure 10:
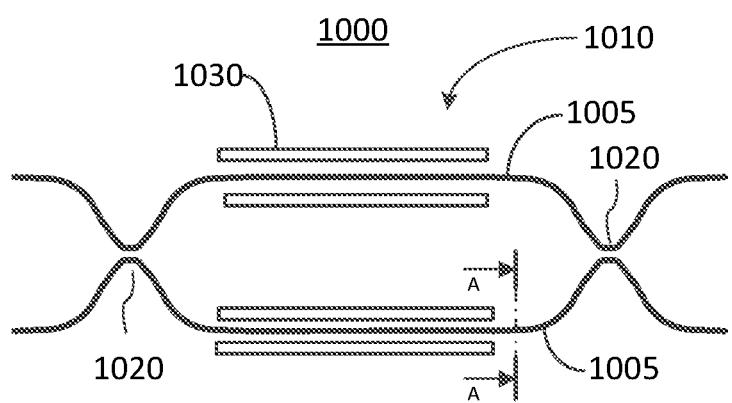
FIG. 10 is a schematic plan view of a PIC implementing a Mach-Zehnder optical modulator (MZM) having waveguide arms formed with thermally-compensated slot optical waveguides.

Thermally-compensated slot optical waveguides of the types described above may provide advantages in PICs implementing various optical devices, including those which use electro-optic (EO) and/or phase-sensitive interference effects in their operation, including but not limited to optical modulators, narrow-band optical filters, wavelength optical multiplexers (MUX) and/or demultiplexers (DEMUX), and the like. FIGS. 8-10 schematically illustrate three example PICs where thermally-compensated slot optical waveguides such as those described above may be utilized.

Referring to FIG. 8, there is shown a layout of a PIC 800 implementing an array waveguide optical grating (AWG)

device 801 that may function as a wavelength optical multiplexer (MUX) or wavelength optical demultiplexer (DEMUX) with reduced temperature sensitivity. The AWG device 801 includes two coupling regions (CR) 820 that are connected by an array of optical waveguides 815 of different lengths, the plurality of which form an AWG. In some implementations the optical path lengths may vary by the same amount between adjacent ones of the optical waveguides 815. In some implementations the optical path lengths may vary by different amounts between adjacent optical waveguides 815. M input optical waveguides 805 connect to an input side of one of the CR 820, and N output waveguides 825 connect to an output side of the second CR 820. In a wavelength MUX configuration the number M of input optical waveguides 805 is greater than one, while the number N of output optical waveguides 825 may be equal to one, or only one of the output optical waveguides 825 may be used during operation. In a wavelength DEMUX configuration the number N of output optical waveguides 825 is greater than one, while the number M of input optical waveguides 805 may be equal to one, or only one of the input optical waveguides 805 may be used during operation.

In order to support athermal or approximately athermal operation, the AWG waveguides 815 may be each implemented as an SWG having a negative-TOC material filling a first region of the slot and being absent from a second region of the slot along a same propagation segment of the slot optical waveguide, as described above. In some embodiments said propagation segment may extend along the whole length, or at least a portion thereof, of the corresponding AWG waveguide 815. For example, FIGS. 1-7 may represent a vertical cross-section of one of the AWG waveguides 815 in various embodiments of the PIC 800, e.g. the cross-section along the "A-A" line indicated in FIG. 8 by way of example. By suitably selecting the fraction of the slot occupied by the negative-TOC material, their optical path lengths may remain substantially independent, or only weakly-dependent, on temperature.

Figure 11:
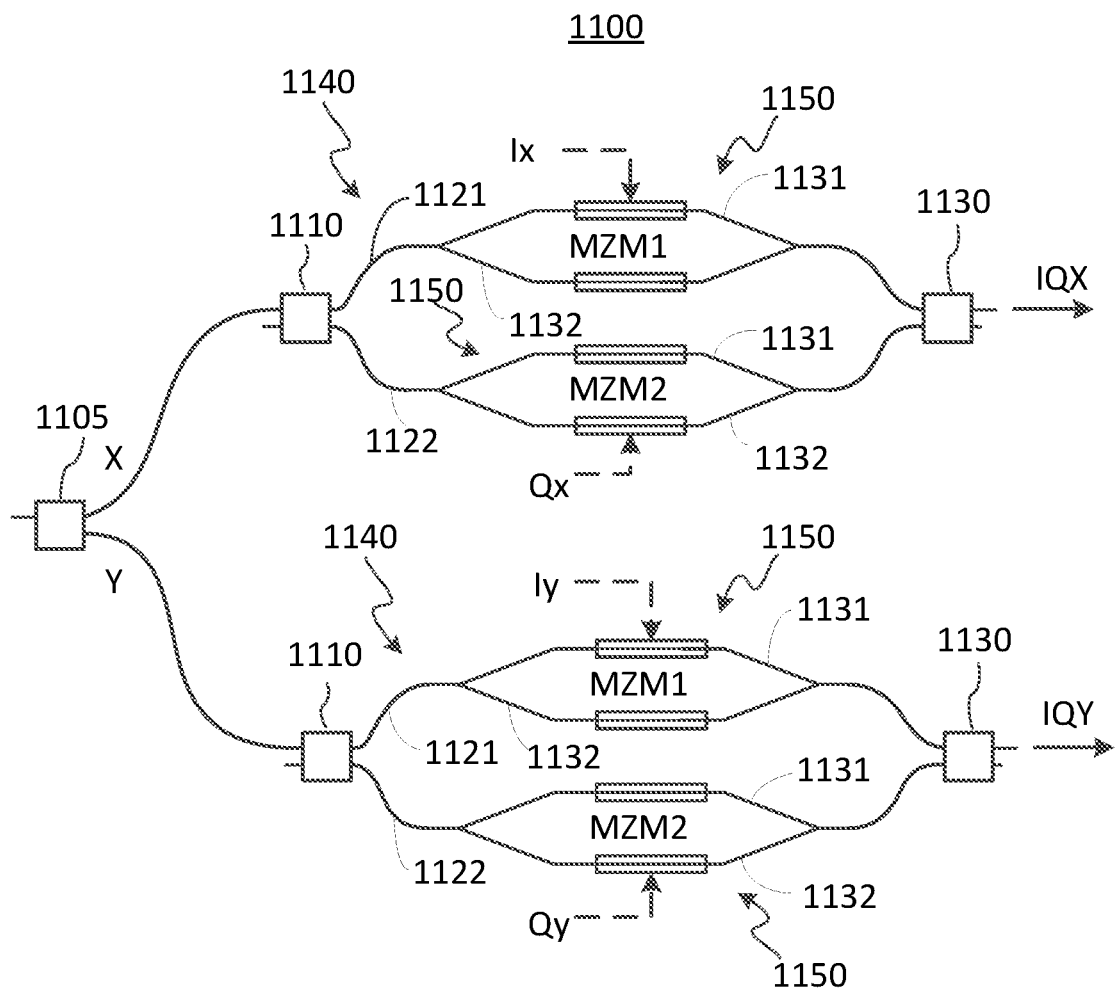
FIG. 11 is a schematic plan view of a PIC implementing a dual nested MZM having waveguide arms formed with thermally-compensated slot optical waveguides.

FIGS. 9-11 illustrate example PICs that may be used as optical modulators. High-speed modulation of optical signals may be achieved, for example, using slot optical waveguides with an electro-optical material within the slot. In some embodiments the electro-optical material within the slot may be a polymer or another material having a negative TOC, such as for example PMMA. In such embodiments, adding a second material having a positive TOC may advantageously lessen the effect of temperature variations on the optical modulator's performance. In such embodiments, the optimum ratio of the positive-TOC and negative-TOC materials within the slot, e.g. in terms of their relative volumes, or in terms of the widths, heights, or thicknesses of the corresponding slot regions, may be determined as a trade-off between the modulation efficiency and thermal stability, and may vary depending on the intended application, FIG. 9 illustrates a PIC 900 implementing a micro-ring optical resonator 910, with an optical waveguide micro-ring 920 evanescently coupled between two optical waveguides 905 that may perform input/output functions. In some embodiments, for example where PIC 900 implements an optical modulator, one of the two optical waveguides 905 is optional and may be omitted, so that the optical waveguide micro-ring 920 is coupled to a single input/output optical waveguide 905. In some embodiments electrical contacts 930 may be provided for applying electrical signals to the optical waveguide micro-ring 920 to tune or modulate optical properties thereof. The micro-ring optical resonator 910 may function for example as a wavelength drop or as an optical modulator, and has a transfer function that depends on the optical path length in the micro-ring 920, and thus may depend on temperature. In order to lessen the temperature dependence of the PIC's performance, the optical waveguide micro-ring 920 along at least some length thereof may be implemented as an SWG having a negative-TOC material partially filling a slot or slots thereof, as described above. For example, in various embodiments of the PIC 900, a vertical cross-section of the optical waveguide micro-ring 920, e.g. the cross-section along the "A-A" line in FIG. 9, may be as described above with reference to any of the FIGS. 1 to 7. In some embodiments a first portion of the optical waveguide micro-ring 920 may be implemented with the thermally-compensated slot optical waveguide as described above, and a second portion, for example comprised in an evanescent coupler 915, may be implemented with a non-slotted optical waveguide, such as a channel waveguide or a ridge waveguide absent of a slot. By suitably selecting the fraction of the slot occupied by the negative-TOC material, their optical path lengths may remain substantially independent, or only weakly-dependent, on temperature.

FIG. 10 illustrates a PIC 1000 implementing a Mach-Zehnder modulator (MZM) 1010, with two optical waveguide arms 1005 connected in parallel between two optical couplers 1020. Electrodes 1030 electrically coupled to the waveguide arms 1005 may be used to electrically modulate the optical phase of light propagating in the waveguide arms. The transfer function of the MZM 1010 depends on the optical path length difference between the waveguide arms 1005, and thus may depend on temperature. In order to reduce the sensitivity of MZM operation to temperature changes, the waveguide arms 1005 may each be implemented with an SWG having a negative-TOC material partially filling a slot or slots thereof, as described above. For example, in various embodiments of the PIC 1000, each of the waveguide arms 1005 may have a vertical cross-section, e.g. along the "A-A" line indicated in FIG. 10, as described above with reference to any of the FIGS. 1 to 7. By suitably selecting the fraction of the slot occupied by the negative-TOC material, their optical path lengths may remain substantially independent, or only weakly-dependent, on temperature. Although only one MZM 1010 is shown in FIG. 10, in some embodiments two or more MZMs may be integrated in a single PIC, with at least some of them utilizing thermally compensated slot waveguides, e.g. as described above with reference to FIGS. 1-7, in their arms.

FIG. 11 illustrates an example PIC 1100 implementing a dual-nested MZM IQ (in-phase, quadrature) modulator that may be used for generating polarization-multiplexed quadrature modulated optical signals. PIC 1100 includes four MZMs 1150 disposed to form two nested MZM modulators 1140, each of which having two MZMs 1150 disposed in the outer arms 1121, 1122 of a Mach-Zehnder interferometer (MZI), which also includes an optical splitter 1110 at its input and an optical combiner 1130 at its output. In the illustrated embodiment, the inputs of the two nested MZM modulators 1140 are connected to different outputs of a polarization splitter 1105, which may include a polarization rotator at one of its outputs. The polarization splitter 1105 splits input light signal into two light signals, which may be referred to as corresponding to an X-polarization channel and a Y-polarization channel. Each nested MZM modulator 1140 may be configured as an IQ modulator, combining in-phase (I) and quadrature (Q) modulation components at the outputs with a $\pi/2$ phase delay. Optical outputs "IQX"

and "IQY" of the nested MZM modulators 1140 may be polarization-multiplexed, for example using a polarization combiner (not shown) with a polarization rotator in one of its input paths (not shown), to form a polarization multiplexed quadrature-modulated optical signal. The MZM arms 1131, 1132 of the MZMs 1150, and the outer arms 1121, 1122 of the nested MZMs 1140 may be implemented with an SWG having a negative-TOC material partially filling a slot or slots thereof, as described above. For example, in various embodiments of the PIC 1100, each of the arms 1121, 1122, 1131, 1132 may have a vertical cross-section as described above with reference to any of the FIGS. 1 to 7. By suitably selecting the fraction of the slot occupied by the negative-TOC material, the dependence of their optical path lengths on temperature may be reduced.

The slot optical waveguides of the type illustrated in FIGS. 1 to 7 may be implemented using a variety of optical materials and material systems. For example, in some embodiments, the high-index portions of the waveguiding optical core, such as the rails described above, may be formed from a silicon (Si) layer or layers of a SOI wafer or chip, with the buried $SiO_2$ layer thereof serving as the lower cladding. In some embodiments, the rails may be formed with amorphous silicon or polycrystalline silicon. In some embodiments the rails may include heavily dope, p-type or n-type, regions of silicon or another semiconductor material. In some embodiments the rails may be formed with a relatively high-index dielectric material, such as silicon nitride ($Si_3N_4$). The first column of Table 1 provides a non-limiting list of negative-TOC materials that may be used to partially fill the lower-index slot or slots of the waveguide. The second and third columns of Table 1 provide approximate values for the refractive index $n_{s1}$ and the TOC $\eta_{s1}$ of the corresponding material at a wavelength $\lambda=1550$ nm that is typically used in telecommunication applications. In some embodiments the slot(s) may also include a suitable optical material having a positive TOC, such as but not exclusively silica ($SiO_2$) or silicon nitride ($Si_3N_4$).

In some embodiments the first and second optical materials for use in the slots of the SWGs, i.e., the optical materials having TOCs of opposite signs, may be selected to have similar indices of refraction. For example, a layer of silica ($SiO_2$) may be used as the second material in embodiments where the negative-TOC material in the slot(s) is one of a PMMA, SU-8, $BaF_2$, $CaF_2$, or $MgF_2$, and a layer of silicon nitride ($Si_3N_4$) may be used as the second material in embodiments where the negative-TOC material in the slot(s) is $TiO_2$. However, embodiments with greater refractive index disparities between these first and second materials within the slot are also within the scope of the present disclosure, and may exhibit thermally compensated behavior.

TABLE 1

| Neg-TOC material | $n_{s1}$ | TOC $\eta_{s1}[K^{-1}]$ |
| --- | --- | --- |
| PMMA | 1.48 | −1.30E−04 |
| SU8 | 1.56 | −1.10E−04 |
| $TiO_2$ | 2.18 | −2.00E−04 |
| $BaF_2$ | 1.46 | −1.00E−05 |
| $CaF_2$ | 1.43 | −1.20E−05 |
| $MgF_2$ | 1.37 | −3.00E−05 |

Using polymer materials exhibiting linear electro-optic effect and a negative TOC in a waveguide slot, such as for example poly-methyl methacrylate (PMMA), may provide advantages in PICs where electrical control of waveguide's properties is desired, such as for example in MZM and micro-ring modulators described above with reference to FIGS. 9, 10, and 11.

Using thermally-compensated slot optical waveguides as described above in wavelength routing optical devices and optical modulators, which are based on optical interference, may enable reducing the wavelength shift of a relevant transfer function of the device by a factor of 3 or greater, or by a factor of 5 or greater, or by a factor of 10 or greater. By way of example, using a silicon slot waveguides with the slot having a PMMA-filled region and a $SiO_2$ filled region as described above may reduce a temperature shift of its transfer function to about 1 GHz/K or less, or down to about 100 MHz/K or less, or in some embodiments down to 10 MHz/K or less. This compares favorably to, and is significantly smaller than a temperature shift of about 7.1 GHz/K for an SWG of the same dimensions but with the slot filled with PMMA only, about 10 GHz/K for a conventional silicon channel waveguide, or about 4.4 GHz/K for an SWG of the same dimensions but with the slot filled with $SiO_2$ only.

For example, simulations show that for an integrated interferometric device that employs optical paths for setting relative phase delays between light to be interfered, a silicon slot waveguide as described above with reference to FIG. 1, with the thickness (volume) ratio of the PMMA and $SiO_2$ materials within the slot $h_1/h_r \cong 0.675$, the temperature shift of the device transfer function may be as small as about 7 MHz/K at optical fiber communication wavelengths (1550 nm) at room temperature. The integrated interferometric device may be, for example, one of the devices described above with reference to FIGS. 8-11, or variants thereof. The transfer function of an optical device describes a ratio of an output optical power to an input optical power, as a function of wavelength.

The present disclosure is not to be limited in scope by the specific embodiments described herein. Indeed, other various embodiments and modifications, in addition to those described herein, will be apparent to those of ordinary skill in the art from the foregoing description and accompanying drawings. For example, in some embodiments the higher-index portions of the slot waveguiding core may comprise suitable materials other than silicon, including but not limited to $Si_4N_3$ and $LiNbO_3$, and/or various semiconductor materials, including compound semiconductors, such as those based on GaAs, InP, and others, with suitable lower-index materials in the slot or slots, and suitable cladding layers such as those conventionally used to form optical waveguides in respective material systems.

Furthermore, features described with reference to a particular example embodiment may also be used in other embodiments, and all such and other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A photonic integrated circuit (PIC) comprising:
a substrate having a planar surface; and
a slot optical waveguide located along the planar surface of the substrate, the slot optical waveguide having an optical core comprising:
two rails extending along the planar surface and being separated by a slot; and,
a first material having a negative thermo-optic coefficient (TOC) and a smaller refractive index than the rails, the first material filling a first region of the slot and being absent from a second region of the slot along a same propagation segment of the slot optical waveguide.

2. The PIC of claim 1 comprising an optical cladding adjacent the optical core, wherein each of the two rails has a greater refractive index than the optical cladding.

3. The PIC of claim 1 wherein the first region has a size in the range from 5% to 90% of a size of the slot in a same direction.

4. The PIC of claim 1 wherein the second region of the slot comprises a second material having a positive TOC and a smaller refractive index than the rails.

5. The PIC of claim 1 wherein the two rails are disposed side-by-side on the planar surface.

6. The PIC of claim 5 wherein:
at least one of the optical cladding and the two rails has a positive TOC, and
the first material forms a layer disposed on the planar surface at least in part within the slot.

7. The PIC of claim 5 wherein:
the slot further comprises a second material having a positive TOC and a smaller refractive index than the rails;
one of the first and second materials forms a first layer disposed upon the planar surface; and
the other of the first and second materials forms a second layer disposed upon the first layer at least in part within the slot.

8. The PIC of claim 7 wherein the second layer extends over the two rails.

9. The PIC of claim 5 wherein the slot further comprises a second material having a positive TOC and a smaller refractive index than the rails, and wherein the first and second materials are side-by-side in the slot along a same segment of the slot optical waveguide.

10. The PIC of claim 4 wherein the two rails are stacked one over the other in a direction normal to the planar surface.

11. The PIC of claim 10 wherein:
one of the first and second materials forms a first layer disposed on the planar surface at least in part in the slot, and
the other of the first and second materials forms a second layer disposed, at least in part, on the first layer in the slot.

12. The PIC of claim 10 wherein:
the optical cladding comprises a layer of silica, and
the two rails comprise silicon (Si) and are spaced apart by a distance in the range from 10 nm to 80 nm.

13. The PIC of claim 5 wherein:
the optical cladding comprises a layer of silica, and
the two rails comprise silicon (Si), are spaced apart by a distance in the range from 50 nm to 210 nm.

14. The PIC of claim 13 wherein the first material is selected from a group consisting of a polymer material, $TiO_2$, $BaF_2$, $CaF_2$, and $MgF_2$.

15. The PIC of claim 14 wherein the second region of the slot comprises at least one of silica, silicon nitride, and a silsesquioxane.

16. The PIC of claim 13 wherein the first material comprises an electro-optic polymer.

17. The PIC of claim 2 wherein the optical cladding comprises a layer of silica, the two rails comprise silicon nitride, and the first material is selected from a group consisting of a polymer material, $BaF_2$, $CaF_2$, and $MgF_2$.

18. The PIC of claim 2 comprising at least one of an array waveguide grating comprising the slot optical waveguide, a Mach-Zehnder modulator comprising the slot optical waveguide, and a micro-ring resonator comprising the slot optical waveguide.

19. The PIC of claim 2, wherein the slot optical waveguide comprises one of a strip-loaded slot optical waveguide and a ridge slot optical waveguide.

20. A photonic integrated circuit comprising:
a substrate having a planar surface; and
a slot optical waveguide on the substrate, the slot optical waveguide comprising an optical core having one or more slots therein,
the one or more slots comprising two materials extending along a same segment of the slot optical waveguide, the two materials having thermo-optic coefficients of opposite signs and refractive indices that are smaller than a refractive index of a remaining portion of the optical core adjacent the one or more slots.

* * * * *